United States Patent [19]

Kaneko

[11] Patent Number: 5,475,297
[45] Date of Patent: Dec. 12, 1995

[54] POWER SUPPLY CIRCUIT FOR AN ELECTRIC DISCHARGE MACHINE

[75] Inventor: Yuji Kaneko, Yokohama, Japan

[73] Assignee: Sodick Co., Ltd., Yokohama, Japan

[21] Appl. No.: 741,431

[22] PCT Filed: Nov. 28, 1990

[86] PCT No.: PCT/JP90/01540

§ 371 Date: Jul. 26, 1993

§ 102(e) Date: Jul. 26, 1993

[87] PCT Pub. No.: WO91/08078

PCT Pub. Date: Jun. 13, 1991

[30] Foreign Application Priority Data

Dec. 6, 1989 [JP] Japan ................... 1-317300

[51] Int. Cl.⁶ .................. G05F 1/40; B23H 1/02
[52] U.S. Cl. .................. 323/282; 219/69.13
[58] Field of Search .................. 323/282, 285, 323/287, 290, 223; 219/69.13, 69.18

[56] References Cited

U.S. PATENT DOCUMENTS

| | | | |
|---|---|---|---|
| 3,832,510 | 8/1974 | Pfau et al. | 219/69 C |
| 4,453,069 | 6/1984 | Inoue | 219/69 P |
| 4,678,885 | 7/1987 | Dresti et al. | 219/69 C |
| 4,713,516 | 12/1987 | Bühler et al. | 219/69 P |
| 5,083,001 | 1/1992 | Kinbara et al. | 219/69.18 |
| 5,126,525 | 6/1992 | Kaneko et al. | 219/69.13 |
| 5,298,709 | 3/1994 | Kaneko et al. | 219/69.13 |
| 5,386,095 | 1/1995 | Kaneko et al. | 219/69.18 |

FOREIGN PATENT DOCUMENTS

| | | |
|---|---|---|
| 5219359 | of 1977 | Japan . |
| 625733 | of 1987 | Japan . |
| 6411712 | 1/1989 | Japan . |

*Primary Examiner*—Peter S. Wong
*Assistant Examiner*—Adolf Berhane
*Attorney, Agent, or Firm*—Marks & Murase

[57] ABSTRACT

In a power supply circuit for an electric discharge machine, an inductive element is placed in circuit with the power supply and the gap. During the rise time of the machining current, the inductor element is shorted out by a switching element TR2 preventing it from affecting the time constant of the circuit. After the machining current's rise time, the inductive element is reinserted in series with the power supply and the gap in order to minimize the machining current cutoff and maintain a continuous flow of machining current.

7 Claims, 2 Drawing Sheets

POWER SUPPLY CIRCUIT FOR AN ELECTRIC DISCHARGE MACHINE

TECHNICAL FIELD

The present invention relates generally to a power supply circuit for an electric discharge machine. More particularly, the present invention relates to a power supply circuit for an EDM machine which reduces machining current cutoff without degrading the machining current waveform.

BACKGROUND OF THE INVENTION

An electric discharge machine ("EDM"), such as that described in Japanese Patent No. 58-40225, has a transistor switch placed between the gap and the power source. The transistor switch is periodically turned on and off for short predetermined periods which defines a machining cycle. Within the "on" time of a machining cycle, the transistor may be intermittently triggered on and off. The intermittent turning on and off of the switching transistor maintains a generally continuous machining current.

When conditions are such that the machining current should be lowered during the predetermined "on" time, the current is cutoff. Therefore, the actual "on" time during a machining cycle is less than the predetermined value of "on" time. This premature cutting-off of the machining current results in reduced machining speed and in faster wear down of the electrodes.

Japanese Patent No. 62-5733, discloses a circuit where the machining current cutoff can be eliminated by the insertion of an inductor in series with the gap. Although this inductor reduces the machining current cutoff, it also increases the time constant of the circuit. The increased time constant causes the rise time of the machining current to increase. This in turn causes a drastic reduction in the machining speed, which is the exact opposite of the desired effect.

SUMMARY OF THE INVENTION

It is an object of the present invention to provide a power supply circuit for an EDM machine which reduces machining current cutoff without increasing the rise time of the machining current.

It is a further object of the present invention to provide an EDM power supply circuit which minimizes machining current cutoff without causing an undesirable increase in machining current rise time due to an inductance.

These and other objects of the present invention are accomplished by the present invention which generally relates to a power supply circuit for an electric discharge machine that periodically turns on a switching element connected between the gap and the power source. An inductor, placed in series with the gap and the power source, is shorted out of the power supply circuit during the rise time of the machining current. After the machining current rise time period is over, the inductor is switched into the circuit to reduce machining current cutoff.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompany drawings, which are incorporated in and form a part of the specification, illustrate an embodiment of the present invention and, together with the description, serve to explain the principles of the invention. In the drawings.

DETAILED DESCRIPTION OF THE PREFERRED EMBODIMENT

Reference will now be made in detail to the present preferred embodiment of the invention, an example of which is illustrated in the accompany drawings.

Figure 1:
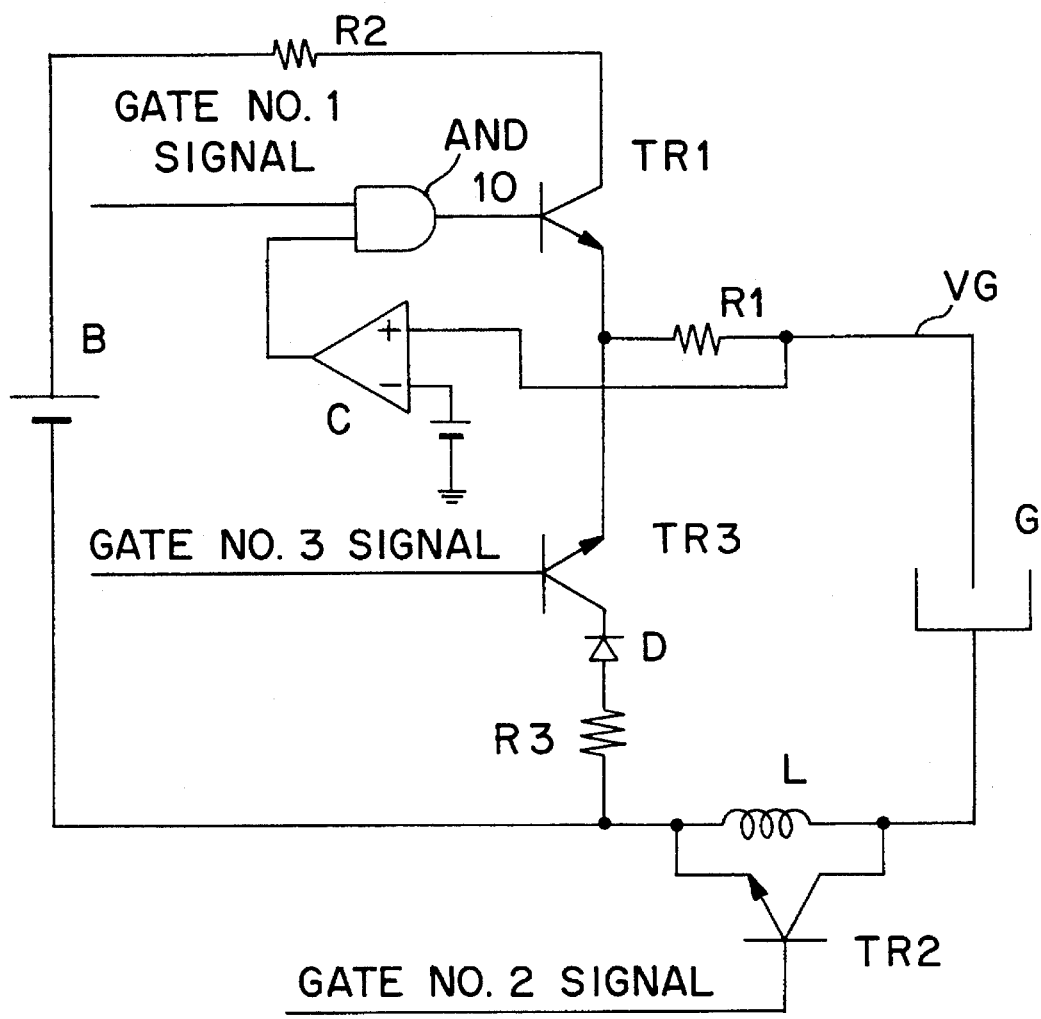
FIG. 1 is a circuit diagram showing one embodiment of the invention.

As shown in FIG. 1, a transistor TR1 which serves as a first switching element, is connected between the power source B and gap G. A resistor R1, connected between the transistor TR1 and gap G is used for measuring the current flowing through the gap G. An inductor L is also connected in series with the gap G. A transistor TR2, which serves as a second switching element, is connected in parallel with the inductor L. A transistor TR3, diode D, and resistor R3 are connected in parallel with the combination of the current measuring resistance R1, gap G, and the parallel combination of inductor L and transistor TR2. The transistor TR3 serves as a third switching element. Transistor TR2 is just one example of a means for shorting out inductor L during the rise time of the machining current and for placing the inductor L into the circuit after the rise time.

The gates of the transistors TR1, TR2 and TR3 are respectively connected to gate signals 1, 2 and 3.

Figure 2:
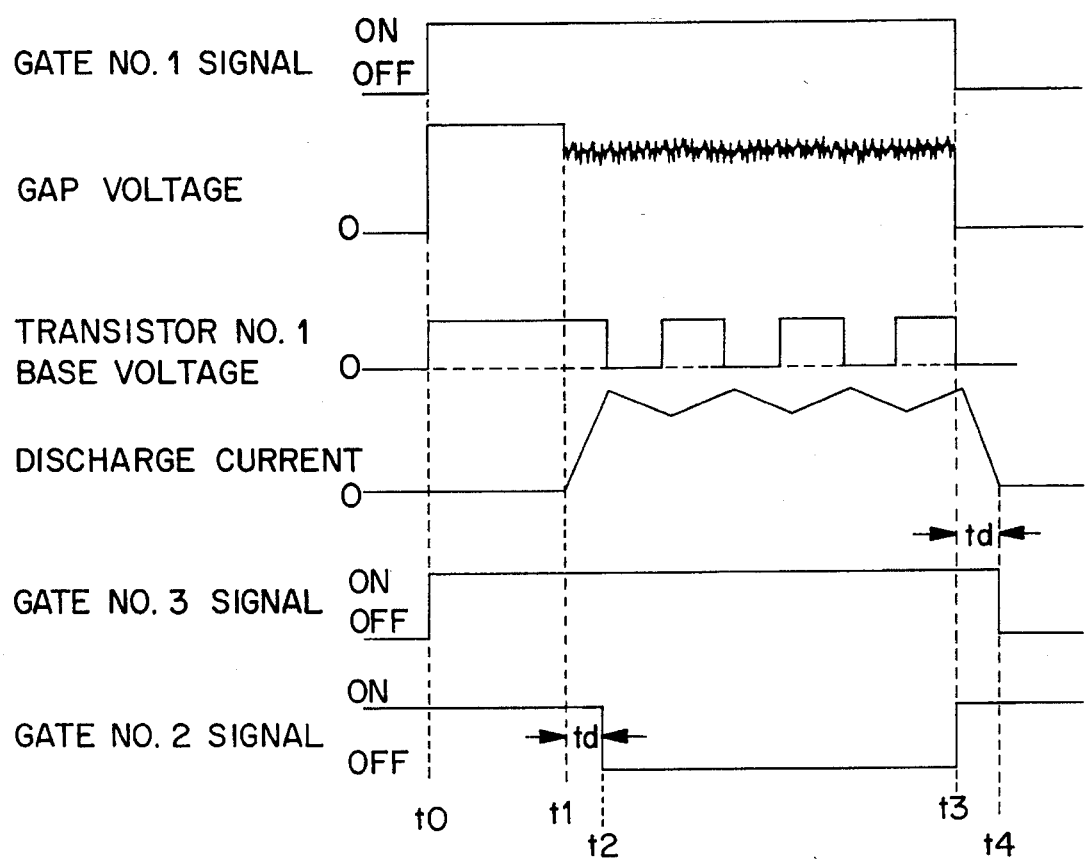
FIG. 2 illustrates signal wave forms at principal points in FIG. 1.

FIG. 2 illustrates the timing diagram for various signal wave forms which appear at principal points in FIG. 1. The operation of the aforementioned embodiment will now be described with reference to FIG. 2.

When the first gate signal goes high or "on" at $t_o$, the base voltage of transistor TR1 goes high, thereby switching on transistor TR1. At that time, since the interpole gap resistance is high, the gap voltage VG is approximately equal to the power source B voltage. Also at time $t_o$, the third gate signal goes high, i.e., to the "on" state, thereby switching on transistor TR3 which is connected opposite to the transistor TR1 in the sense of direction of current flow. At time $t_1$, a certain time after $t_o$, the gap G begins to break down or ionize and the discharge current begins its rise time as current starts to flow in the gap G. The rise time of the discharge current is completed at time $t_2$.

As illustrated in FIG. 2, the transistor TR2 is turned on by the second gate signal a predetermined time $t_d$ after the start of the rise time. During this period the transistor TR2 is switched on and the inductor L is thereby shorted out of the circuit. The inductor L is again brought back into the circuit at a time $t_3$, at which time the transistor TR1 is gated off and the discharge current begins its fall time.

As alluded to above, the transistor TR3 is turned on at approximately the same time as the transistor TR1 is turned on. However, the transistor TR3 is turned off a predetermined time $t_d$ after transistor TR1 is turned off. When transistor TR1 is off and transistor TR3 is on, the electromotive force ("emf") generated by the inductor L causes current to flow through transistor TR3 and gap G. In this manner the current efficiently generates a discharge machining current.

Turning again to FIG. 1, the value of the voltage VG is indicative of the current flowing through current measuring resistance R1 and also through the gap G. The comparator C compares the gap voltage VG to a reference voltage (schematically indicated by a battery) for the comparing the gap current to a predetermined value of current. The comparator C outputs a high signal when the gap voltage VG is higher than the reference voltage, which corresponds to the gap current being below the predetermined current. The output of the comparator C and the first gate signal are input to an AND gate 10. The output of the AND gate 10 drives the base of the transistor TR1 for switching the transistor on and off. Thus, when the AND gate 10 receives a high first gate signal, but the gap voltage VG is lower than the reference voltage, the AND gate 10 outputs a gate signal to switch off transistor TR1. Only when the first gate signal is high and the gap voltage VG exceeds the reference voltage, corresponding to the gap current being below the predetermined value of current, will the gate output a high gate signal to the base of transistor TR1.

During the discharge current rise time $t_d$ ($t_d=t_2-t_1$), the transistor TR2 is turned on and inductor L is shorted out of the circuit. Therefore, during the time $t_d$ inductor element L does not add to the time constant of the circuit. Consequently, it does not effect the rise time of the discharge current.

At the end of the discharge current rise time, i.e. at $t=t_2$, the second gate signal is turned off, thereby turning off transistor TR2. At this time, the inductor L is connected in series with the gap G and the power supply B. With the inductor L in the circuit, the discharge current (machining current) tends to smooth out, thereby preventing current spikes which cause the machining current to cutoff.

When the first gate signal goes to the "off" state at time $t_3$, the second gate signal is switched "on" so that transistor TR2 is turned "on". By turning "on" transistor TR2, the inductor L is effectively removed from the circuit, thus allowing the discharge current to fall rapidly. The third gate signal is switched to the "off" state after a time delay $t_d$ following the transition of the first gate signal to the "off" state. The transistor TR3 is kept on during this time delay period $t_d$ in order to prevent damage to the transistor TR1 from a reverse emf.

As should now be understood by the artisan, during the "on" time of the machine, i.e., between the times $t_2$ and $t_3$, the transistor TR1 is repeatedly switched "on" and "off" at high speeds, by the signal from the AND gate 10 in order to maintain an almost constant flow of discharge current through the gap G. Also during this time, an emf is developed across inductor element L whenever the transistor TR1 is switched "off". With the transistor TR1 off, discharge current flows through resistor R3, diode D, transistor TR3, current measuring resistor R1, and gap G. Thus, even when transistor TR1 is switched off, discharge current still flows through gap G. The emf developed across the inductor L is another reason why the discharge current does not cutoff.

Various modifications to the embodiment of FIG. 1 may be made without departing from the scope and spirit of the invention. For instance, other types of current measurement means may be used in place of the current measuring resistance R1 for measuring the gap current. Also, other types of switching elements may be used in place of transistors TR1, TR2 and TR3. Additionally, transistor TR3 may be deleted from the embodiment of FIG. 1.

Through the power supply circuit of the present invention, the machining current is prevented from being cutoff without increasing the rise time of the current while maintaining machining speed.

We claim:

1. A power supply for an electric discharge machine having a first switching element connected between a power source and a gap and responsive to a first gate signal having an ON time, during at least a portion of which ON time a gap current is caused to flow through said gap, and an OFF time, comprising:

means for measuring the gap current flowing in said gap;

means responsive to said means for measuring for maintaining the gap current at a constant value by repeatedly opening and closing said first switching element during the ON time of said first gate signal, said first switching element being opened by said means for maintaining when said gap current is greater than a predetermined current;

an inductive element connected in series with said gap; and means for electrically bypassing said inductive element during a rise time of the gap current during the ON time of the first gate signal, and thereafter for restoring said inductive element to said power supply during a remainder of the ON time of the first gate signal.

2. The power supply of claim 1, wherein said means for maintaining closes said first switching element when said gap current is less than said predetermined current.

3. A power supply for an electric discharge machine having a first switching element connected between a power source and a gap and responsive to a first gate signal having an ON time, during at least a portion of which a gap current is caused to flow through said gap, and an OFF time, and means for intermittently switching the first switching element between an ON and OFF condition during the ON time of said first gate signal, said power supply further comprising:

means for measuring the gap current flowing in said gap;

an inductive element connected in series with said gap; and a second switching element connected in parallel with said inductive element and operable to be switched between an ON and an OFF condition, wherein said second switching element is maintained in an ON condition during a rise time of said gap current and thereafter in an OFF condition until said first switching element is turned OFF.

4. The power supply of claim 3, further comprising a third switching element connected in parallel with the series combination of said gap and said inductive element and operable to be switched between an ON and an OFF condition, wherein said third switching element is switched to its ON condition at approximately the same time as said first switching element is switched to its ON condition and wherein said third switching element is switched to its OFF condition a predetermined time after said first switching element is switched to its OFF condition.

5. The power supply of claim 3, wherein said intermittent switching means comprises means for comparing said gap current to a predetermined current, wherein said comparing means switches said first switching element to its said OFF condition when said gap current is greater than said predetermined current and switches said first switching element to said ON condition when its said gap current is less than said predetermined current.

6. The power supply of claim 3, wherein said second switching element comprises a transistor responsive to a second gate signal having an ON state and an OFF state, said second gate signal being in its said ON state during said gap current rise time and thereafter in its OFF state during the remainder of the ON time of said first gate signal.

7. The power supply according to claim 4, wherein said third switching element comprises a transistor responsive to a third gate signal having an ON state and an OFF state, said third gate signal being in its said ON state commencing approximately from the time when said first gate signal is switched to said ON time and until said predetermined time after said first switching element is switched to its OFF condition.

* * * * *